US008678481B2

(12) United States Patent
Tamura

(10) Patent No.: US 8,678,481 B2
(45) Date of Patent: Mar. 25, 2014

(54) STRUCTURE FOR SIDE PORTION OF VEHICLE BODY

(75) Inventor: Naoyuki Tamura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/518,458

(22) PCT Filed: Nov. 5, 2010

(86) PCT No.: PCT/JP2010/069685
§ 371 (c)(1),
(2), (4) Date: Jun. 22, 2012

(87) PCT Pub. No.: WO2011/077840
PCT Pub. Date: Jun. 30, 2011

(65) Prior Publication Data
US 2012/0274099 A1 Nov. 1, 2012

(30) Foreign Application Priority Data
Dec. 22, 2009 (JP) .................. 2009-290784
Mar. 8, 2010 (JP) .................. 2010-050541

(51) Int. Cl.
*B62D 25/02* (2006.01)

(52) U.S. Cl.
USPC ............... 296/193.05; 296/193.06; 296/209; 296/203.03

(58) Field of Classification Search
USPC ............... 296/209, 203.03, 193.05, 193.06
See application file for complete search history.

(56) References Cited

U.S. PATENT DOCUMENTS 8,308,227 B2 * 11/2012 Tsuruta et al. ............... 296/209

FOREIGN PATENT DOCUMENTS

| JP | 2000-095151 | 4/2000 |
| JP | 2000-211549 | 8/2000 |

OTHER PUBLICATIONS

Microfilm of the specification and drawings annexed to the request of Japanese Utility Model Application No. 111555/1976 (Laid-open No. 029011/1978) (Toyota Motor Co., Ltd.) Mar. 13, 1978. Listed in International Search Report. English abstract included.
International Search Report dated Jan. 18, 2011.

* cited by examiner

*Primary Examiner* — Dennis Pedder
*Assistant Examiner* — Beverly Becker
(74) *Attorney, Agent, or Firm* — Rankin, Hill & Clark LLP

(57) ABSTRACT

A structure for a side portion of a vehicle body, wherein the respective lower parts of a front pillar are joined to a side sill. A pillar's lower part (64) of a center pillar(21) and a pillar's lower part (65) of a front pillar (16) are provided with overlapping joining sections (31) having circular arc sections (68) which are formed so as to be separated outward from a corner (67) of a side sill (14). The overlapping joining sections (31) are overlapped on a vertical wall section (27) of the side sill (14). The overlapping joining sections (31) are provided with bead sections (72) separated from the vertical wall section (27). The overlapping joining sections (31) are also provided with contact sections (101) in contact with the vertical wall section (27).

3 Claims, 13 Drawing Sheets

STRUCTURE FOR SIDE PORTION OF VEHICLE BODY

TECHNICAL FIELD

The present invention relates to a vehicle body side portion structure wherein a front pillar and a center pillar are connected to a side sill at respective lower portions thereof.

BACKGROUND ART

Such a vehicle body side portion structure has been proposed in Patent Literature 1 by the present applicant.

The structure includes a side sill having a hollow profile of substantially rectangular cross section formed by a side-sill outer member and a side-sill inner member. The side-sill outer member has a U-shaped cross section and includes a vertical wall disposed at an outer side thereof, an upper wall integrally extending from an upper end of the vertical wall toward a passenger compartment, and a lower wall integrally extending from a lower end of the vertical wall toward a passenger compartment. The vertical, upper and lower walls of the side-sill outer member respectively have concave bead parts inwardly concaved toward a hollowed inner part of the side-sill outer member to enhance the strength thereof.

The structure also includes a center pillar having at a lower part thereof a connection wall part to be laid on and connected to upper and vertical walls of the side-sill outer member.

However, the structure of Patent Literature 1 also has a corner part between the upper and vertical walls of the side sill, which corner part is liable to undesirably contact or interfere with a corner section of the connection wall part of the center pillar.

More particularly, when the corner part of the side-sill outer member has a radius smaller than that of the corner section of the connection wall part of the center pillar, the corner part of the side-sill outer contacts the corner section of the center pillar, causing undesirable interference between the corner part and the corner section.

The corner part of the side sill may be designed to have a radius so as not to interference with the corner section of the center pillar, but when priority is given to productivity and strength, radius selection for the corner part is limited.

PRIOR ART LITERATURE

Patent Literature

Patent Document 1: Japanese Patent Application No. 2009-176856 (JP 2010-137839 A)

SUMMARY OF INVENTION

Technical Problem

It is therefore an object of the invention to provide a vehicle body side part structure that upon connection of front and center pillars to a side sill, undesired contact or interference between them is avoided, and a connection between the side sill and the front and center pillars is strengthened.

Solution to Problem

In order to accomplish the above-mentioned object, the present invention provides a vehicle body side portion structure comprising: right and left side sills extending longitudinally of a vehicle and forming right and left ends of a floor of a passenger compartment of the vehicle; pillar lower ends of right and left front pillars each extending upward from a front portion of the respective side sill; and pillar lower ends of right and left center pillars each extending upward from a center portion of the respective side sill, wherein each of the side sills includes a side-sill inner member disposed on a side of the passenger compartment and a side-sill outer member disposed in opposed relation to the side-sill inner member so as to form the side sill into a profile of closed cross section, the side-sill outer member includes an upper wall disposed at an upper portion thereof, a vertical wall continuing from the upper wall, a lower wall continuing from the vertical wall and located at a lower level in opposed relation to the upper wall, and an opening oriented toward the passenger compartment, such that the side-sill outer member has a profile of U- or hat-shaped cross section, at least one of the pillar lower parts of the center and front pillars has an arcuate part spaced radially outwardly from a corner part where the upper wall and the vertical wall meet, and an overlap-connection part continuing from the arcuate part and laid on and connected to the vertical wall, and the overlap-connection part has a contact part, located below and continuing from the arcuate part, for contacting the vertical wall.

Preferably, the overlap-connection part includes a bead part provided on a vehicle-forward side or a vehicle-rearward side of the contact part so as to be continuous from a top of the arcuate part and spaced from the vertical wall.

Desirably, the contact part and the bead part are provided plurally and arranged alternately in a longitudinal direction of the vehicle.

In a preferred form, the side sill has a vertical-wall bead recessed concavely toward an inside thereof and extending from a front part to a rear part of the side sill, and the vertical-wall bead is covered by the bead part.

Advantageous Effects of Invention

According to the invention, the overlap-connection part has the arcuate part distanced outwardly from the corner part of the side sill, so that the overlap-connection part advantageously does not contact the corner part of the vertical wall positioned behind the overlap-connection part, in a state that the overlap-connection part is connected on the vertical wall of the side sill.

Furthermore, the overlap-connection part has the bead part distanced outwardly from the vertical wall, which configuration forms a sidewall (orthogonal-side part) having a width corresponding to the distance between the vertical wall and an outermost of the bead part. The orthogonal-side part enhances the strength of the overlap-connection part and a section (cross-connection part) where the overlap-connection part is connected to the side sill.

Furthermore, each of the plurality of contact parts can be disposed separately interposing the bead part therebetween in the front-rear direction of the vehicle, such that each of the contact parts and the bead part are disposed alternately. Such a configuration enhances the strength of the overlap-connection part and the section where the overlap-connection part is connected to the side sill.

Moreover, the bead part of the overlap-connection part crosses and covers the vertical-wall bead longitudinally formed in the vertical wall in the front-rear direction of the vehicle body, which configuration can further enhance the strength of the section where the overlap-connection part is connected to the side sill.

DESCRIPTION OF EMBODIMENTS

Certain preferred embodiments of the present invention will be described referring to the accompanying drawings.

[First Embodiment]

Figure 1:
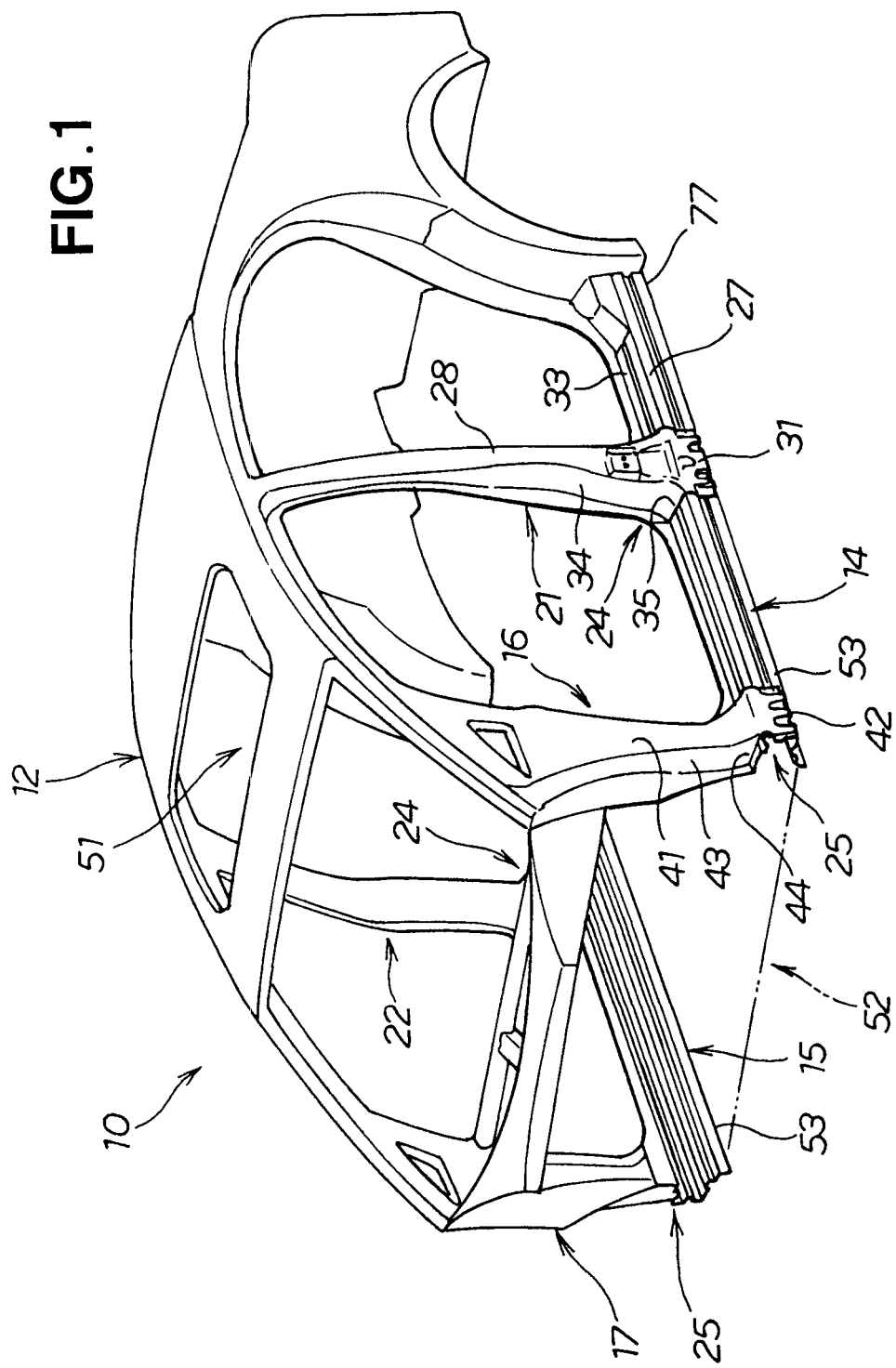
FIG. 1 is a perspective view showing a vehicle body employing a vehicle body side portion structure according to a first embodiment of the present invention.

As shown in FIG. 1, a vehicle body side portion structure according to a first embodiment of the present invention is applied to a lower part of a vehicle body 12 of a vehicle 10.

The vehicle body side portion structure includes left and right side sills 14, 15 provided at a lower part of the vehicle body 12, and left and right front pillars 16, 17 and left and right center pillars 21, 22 connected to the side sills 14, 15, respectively.

Each of the center pillars 21, 22 has at a lower part thereof a center connection structure 24 that is connected to the respective side sill 14 or 15. Each of the front pillars 16, 17 has at a lower part thereof a front connection structure 25 that is connected to the respective side sill 14 or 15.

As shown in FIGS. 1 to 5, the center connection structure 24 includes an overlap-connection part (center overlap-connection part) 31 that is continuous from a side wall 28 of the center pillar 21 and is laid on and connected to a vertical wall 27 of the side sill 14.

The center connection structure 24 of the center pillar 21 also includes a front wall 34 with a front connection part 35 which is laid on and connected to an upper wall 33 of the side sill 14.

The center connection structure 24 of the center pillar 21 includes additionally a rear wall 37 with a rear connection part 38 which is laid on and connected to the upper wall 33 of the side sill 14.

As shown in FIGS. 1 and 6 to 9, the front connection structure 25 includes an overlap-connection part (front overlap-connection part) 42 being continuous from a side wall 41 of the front pillar 16 and laid on and connected to the vertical wall 27 of the side sill 14.

The front connection structure 25 also includes a front connection part 44 continuing from a front wall 43 (see FIG. 1) of the front pillar 16 and laid on and connected to the upper wall 33 of the side sill 14.

The front connection structure 25 includes additionally a rear connection part 47 continuing from a rear wall 46 of the front pillar 16 and laid on and connected to the upper wall 33 of the side sill 14.

Discussion will be made next as to primary members of the vehicle body side portion structure, referring to FIGS. 1 to 9.

The vehicle body side portion structure forms left and right side ends of a floor (underbody) 52 of a passenger compartment 51. More specifically, the left and right side sills 14, 15 extend in a front-rear direction of the vehicle 10, while the left and right front pillars 16, 17 extend upward from front ends 53, 53 of the side sills 14, 15, respectively. The left and right center pillars 21, 22 extend upward from the centers of the left and right side sills 14, 15, respectively.

Figure 3:
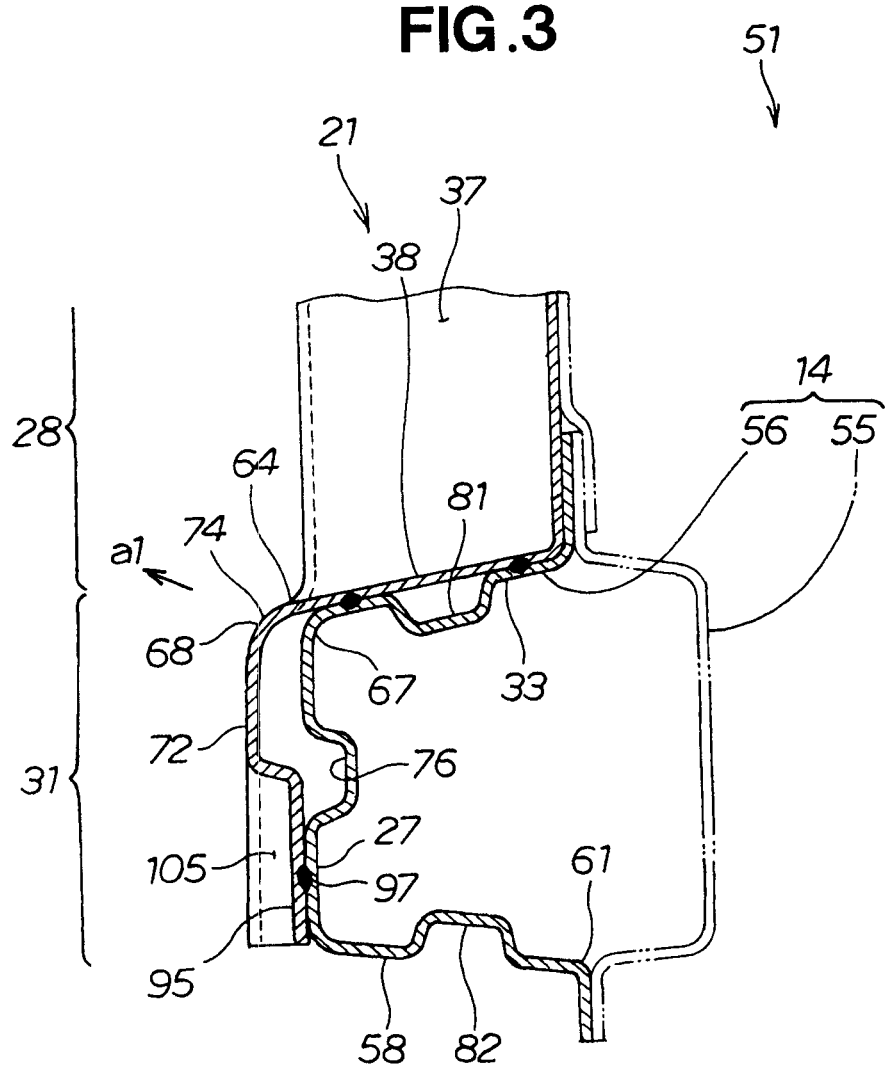
FIG. 3 is a cross-sectional view taken along line 3-3 of FIG. 2.
Figure 4:
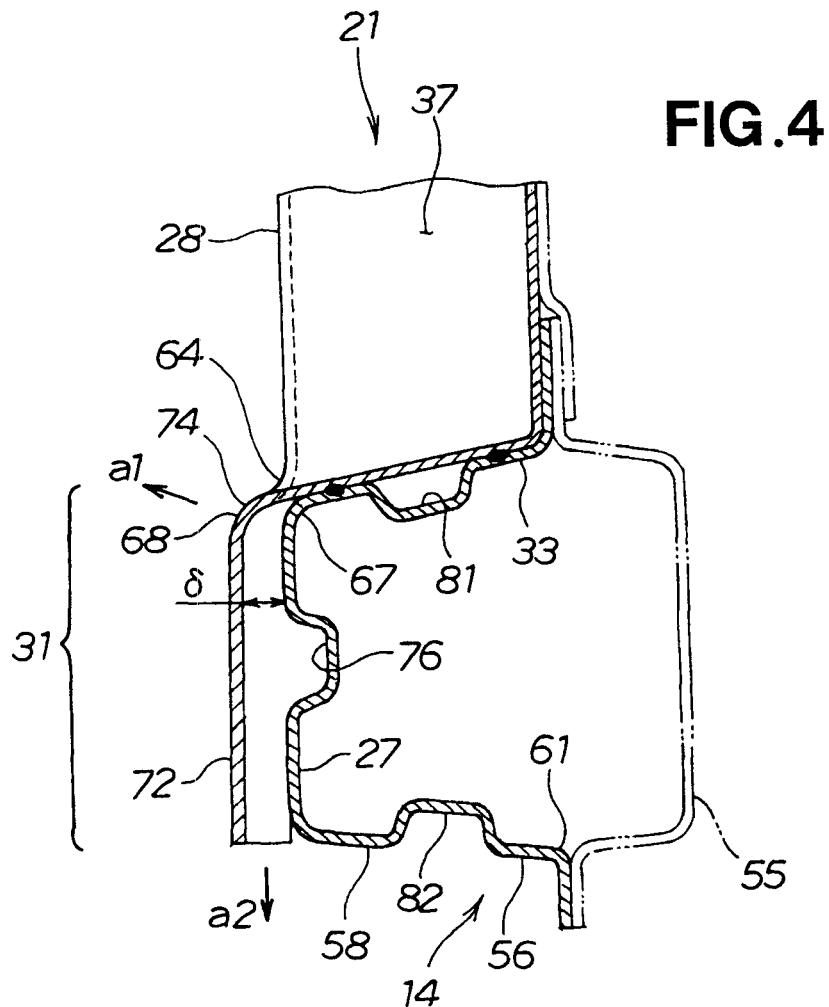
FIG. 4 is a cross-sectional view taken along line 4-4 of FIG. 2.

As shown in FIG. 3, the side sill 14 has a closed profile in cross section, which is defined by a side-sill inner member 55 facing the passenger compartment 51 and a side-sill outer member 56 opposed to the side-sill inner member 55.

The side-sill outer member 56 includes an upper wall 33 oriented upwardly of the vehicle 10, a vertical wall 27 continuing from the upper wall 33, and a lower wall 58 continuing from the vertical wall 27 and opposed to the upper wall 33. The side-sill outer member 56 has a U- or hat-shaped cross section with an opening 61 opposed to the vertical wall 27 and facing the passenger compartment 51.

In the embodiment being described, each of the left and right center pillars 21, 22 includes a pillar lower part 64 while each of the left and right front pillars 16, 17 includes a pillar lower part 65. Both pillar lower parts 64, 65 have respective arcuate or curved parts 68, 71 distanced or spaced radially outwardly (in the direction of arrow "a1") from a respective corner part 67 where the upper wall 33 meets the vertical wall 27. The pillar lower parts 64, 65 also include respective overlap-connection parts 31, 42 that continue from the respective arcuate parts 68, 71 and are laid on and connected to the respective vertical wall 27. The overlap-connection parts 31, 42 have respective bead parts 72, 73, which are distanced or spaced from the respective vertical wall 27 and continuous from respective top parts 74 of the arcuate parts 68, 71.

Of the upper wall 33, lower wall 58 and vertical wall 27 of the side sill 14, at least the vertical wall 27 has a vertical-wall bead 76 recessed concavely toward an inside of the side sill 14 and extending from a front end 53 to a rear end 77 of the side sill 14.

In the embodiment being discussed, the upper wall 33 has an upper-wall bead part 81, while the lower wall 58 has a lower-wall bead part 82.

The overlap-connection parts 31, 42 are connected to the vertical walls 27, 27, respectively.

The bead parts 72, 73 of the overlap-connection parts 31, 42 are distanced from the respective vertical wall 27 and extend over the vertical-wall beads 76, 76 formed in the respective vertical wall 27, each forming a space therebetween.

Next, the overlap-connection part 31 of the center pillar 21 will be described in detail.

The overlap-connection part 31 of the center pillar 21 has a height about the same as that of the vertical wall 27 of the side sill 14, and has a longitudinal length about twice longer than its height. The overlap-connection part 31 has a body part 85 that includes a front section 91, a rear section 92, a front lower section 93, a center upper section 94 and a rear lower section 95.

The front section 91 positioned at a side of the front pillar 16 and the rear section 92 positioned on an opposite side are brought into contact with the vertical wall 27 and connected to the vertical wall 27 with welds 97.

The front section 91 continues from an end (contact part) 101 of the arcuate part 68, which end 101 is held in contact with the vertical wall 27.

While being partially held in contact with the vertical wall 27, the front section 91 extends over the vertical-wall bead 76 of the vertical wall 27.

The rear section 92 continues from the end (contact part) 101 of the arcuate part 68 and extends over the vertical-wall bead 76 of the vertical wall 27 and then contact partially with the vertical wall 27.

The front lower section 93, center upper section 94 and rear lower section 95, disposed in the named order between the front section 91 and rear section 92, are connected to the vertical wall 27 with welds 97. The remaining area of the overlap-connection part 31 forms a bead part 72.

As shown in FIG. 3, the rear lower section 95 adjacent to the rear section 92 (see FIG. 2) is connected to the vertical wall 27 below the vertical-wall bead 76 with a weld 97.

The front lower section 93 adjacent to the front section 91 is held in contact with the vertical wall 27 below the vertical-wall bead 76 and joined therewith with a weld 97.

The center section 94 at the center of the body part 85 is connected to the vertical wall 27 above the vertical-wall bead 76 with a weld 97.

Figure 5:
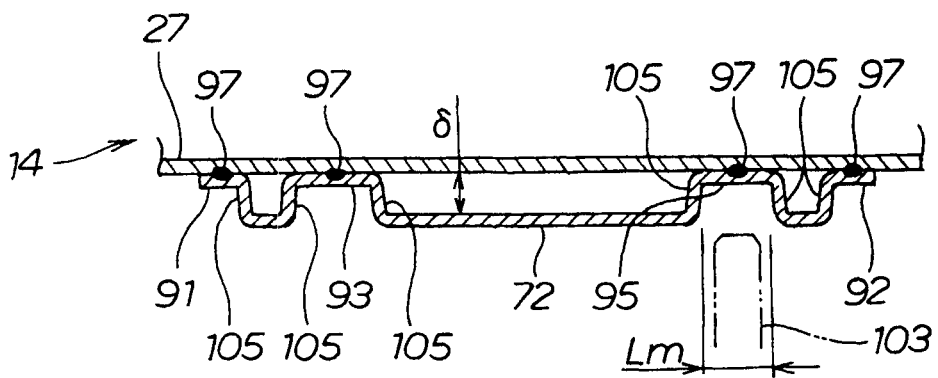
FIG. 5 is a cross-sectional view taken along line 5-5 of FIG. 2.
Figure 6:
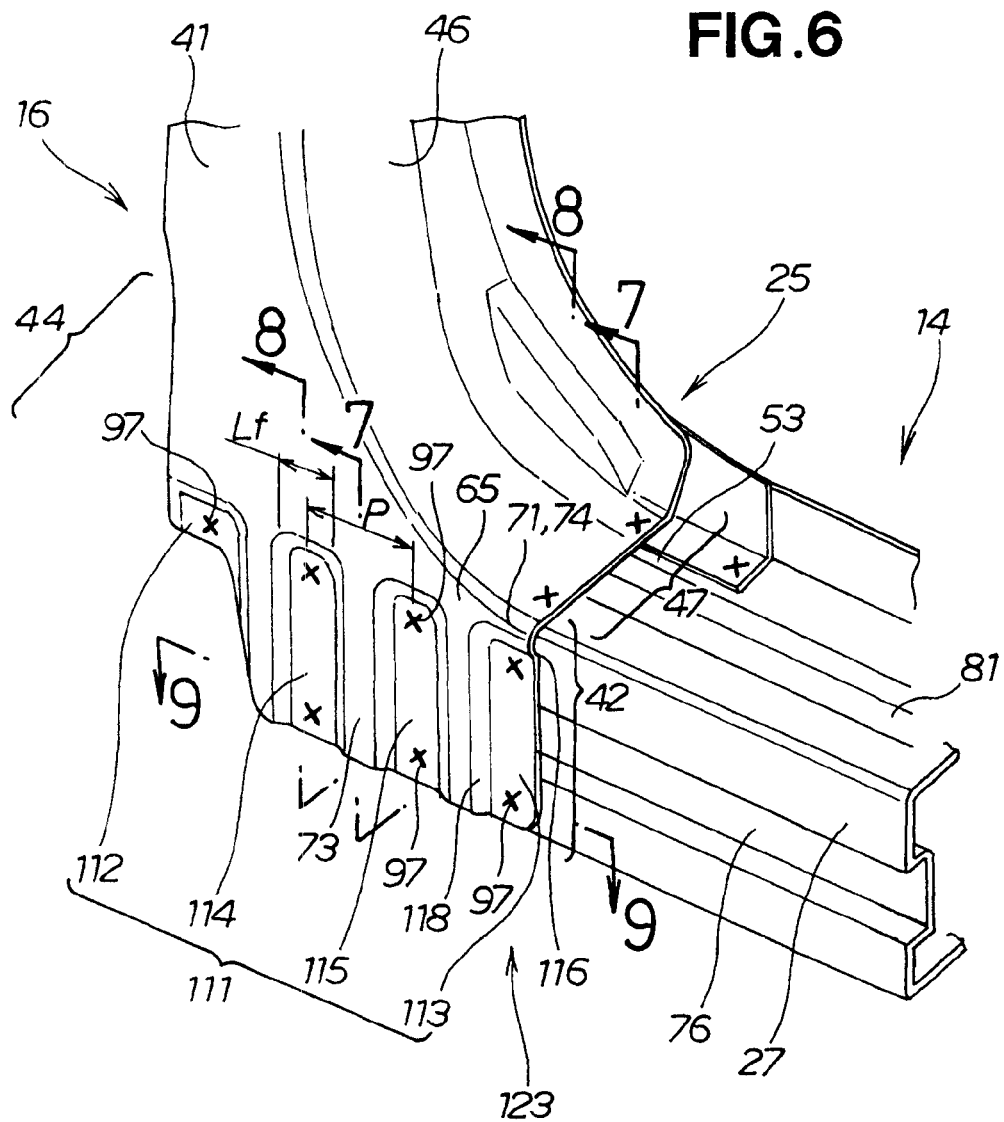
FIG. 6 is an enlarged perspective view illustrating a state of connection between a front pillar and the side sill of FIG. 1.

As shown in FIG. 5, the front lower section 93, center upper section 94 and rear lower section 95 each has a front-rear length Lm, i.e., an area of contact with the vertical wall 27, which is slightly longer than an electrode 103 that pinch-presses those sections upon spot welding.

Figure 2:
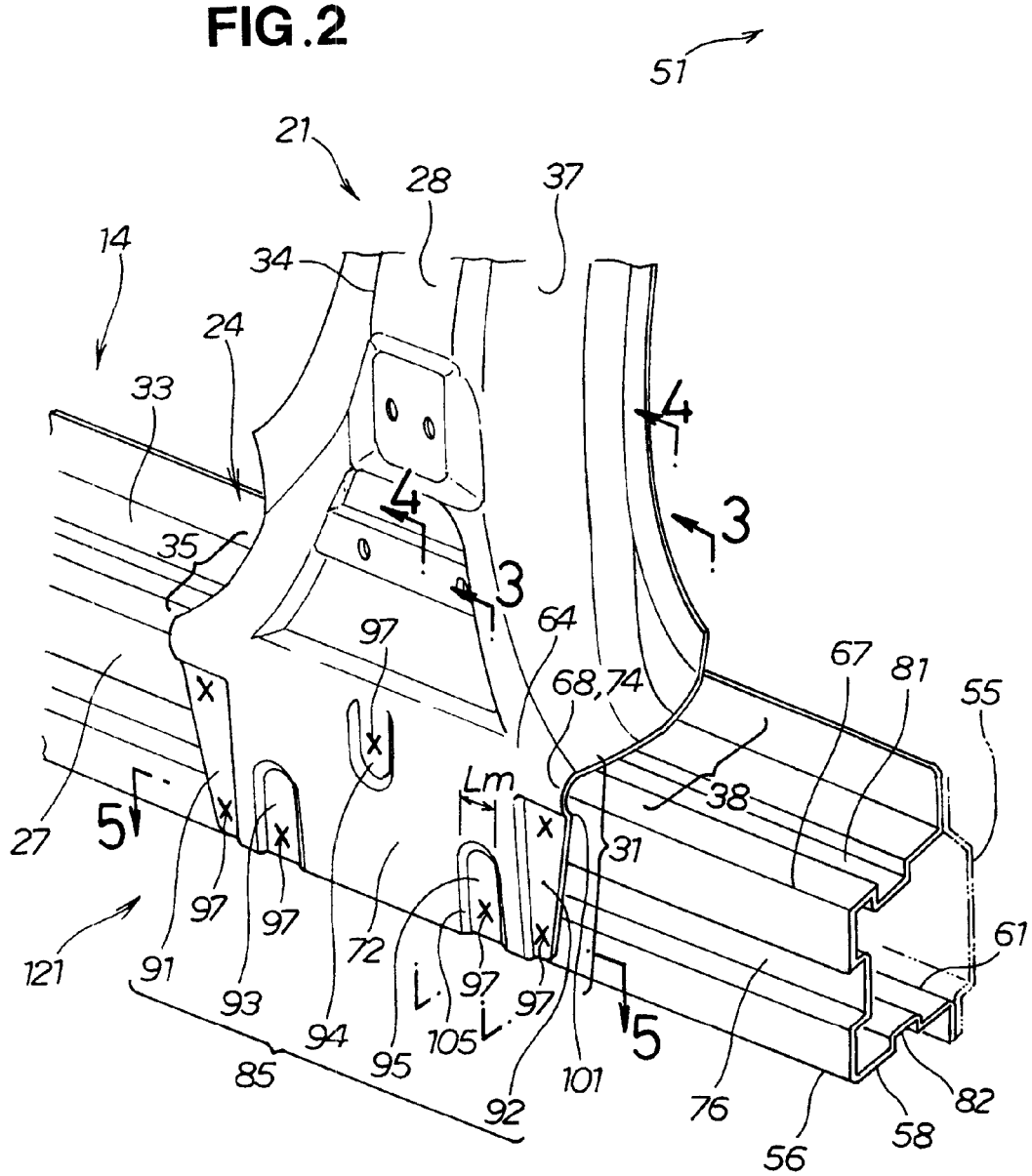
FIG. 2 is an enlarged perspective view illustrating a state of connection between a center pillar and a side sill of FIG. 1.

Stated otherwise, the front section 91, rear section 92, front lower section 93, center upper section 94 and rear lower section 95 configuring the body part 85 of the overlap-connection part 31 are disposed in a front-rear direction of the vehicle 10 interposing the bead part 7 therebetween (see FIGS. 2 and 5).

The bead part 72 connected to the front section 91, rear section 92, center upper section 94 and rear lower section 95 extends parallel to the vertical wall 27 with a distance δ (see FIG. 5) spaced therefrom.

The distance δ is generally the same as the height between the vertical wall 27 and the top part 74 of the arcuate part 68.

Specifically, the bead part 72 is formed next to the top part 74 and has an orthogonal-side part 105 having a height δ, as shown in FIG. 5.

The overlap-connection part 42 of the front pillar 16 will now be described in detail, referring to FIGS. 6 to 9.

The overlap-connection part 42 of the front pillar 16 has a height about the same as that of the vertical wall 27 of the side sill 14 and a front-rear length that is about twice longer than its height. The overlap-connection part 42 has a body part 111.

The body part 111 includes a front section 112, a rear section 113, a first center section 114 and a second center section 115.

The front section 112 at a front side of the vehicle 10 and the rear section 113 at a rear side of the vehicle are brought into contact with and connected to the vertical wall 27 with welds 97.

The front section 112 is continuous with an end (contact part) 116 of the arcuate part 71. The contact part 116 is held in contact with the vertical wall 27.

The rear section 113 is continuous with the contact part 116 of the arcuate part 71. The contact part 116 is held in contact with the vertical wall 27.

Figure 7:
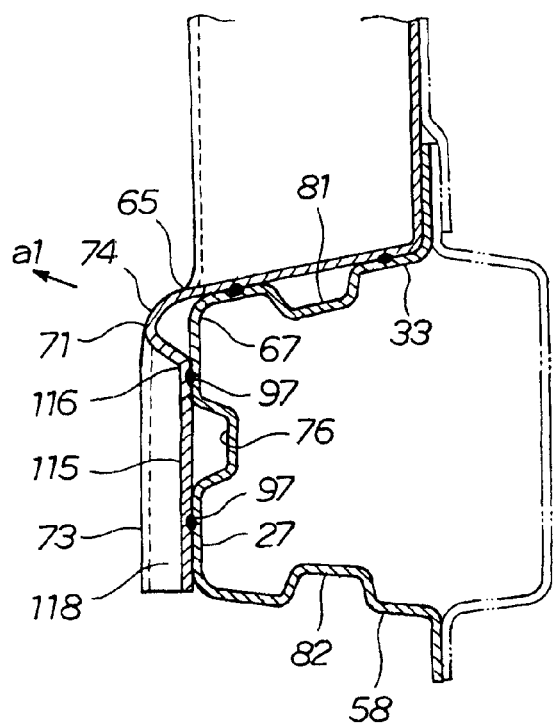
FIG. 7 is a cross-sectional view taken along line 7-7 of FIG. 6.

As shown in FIG. 7, the second center section 115 is continuous with the end or contact part 116 of the arcuate part 71. The contact part 116 is held in contact with the vertical wall 27. The second center section 115 is held in contact with the vertical wall 27 and passes over the vertical-wall bead 76 in such state.

The first center section 114 is configured similarly to the second center section 115.

The first center section 114 and second center section 115 are disposed in the named order from the front between the front section 112 and rear section 113, and connected to the vertical wall 27 with welds 97. Remaining area of the overlap-connection part 42 forms a bead part 73.

The front section 112, rear section 113, first center section 114 and second center section 115 are distanced from one another with a pitch P.

Stated otherwise, the body part 111 and bead part 73 are disposed alternately in the front-rear direction of the vehicle.

The first center section 114, front section 112, rear section 113 and second center section 115 have a front-rear length Lf that is generally the same as the front-rear length Lm in the overlap-connection part 31 of the center pillar 21.

Figure 8:
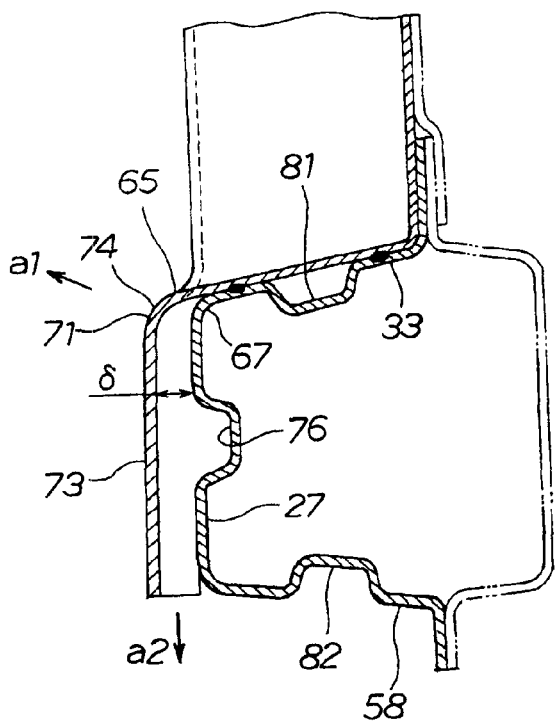
FIG. 8 is a cross-sectional view taken along line 8-8 of FIG. 6.

As shown in FIG. 8, the bead part 73 is spaced from the vertical wall 27 of the side sill 14 by a distance 6 and extends parallel to the vertical wall 27.

The distance 6 has a height generally equal to the height from the vertical wall 27 to a top part 74 of an arcuate part 71.

Figure 9:
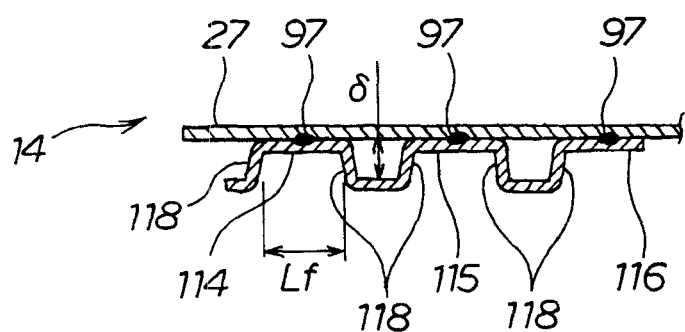
FIG. 9 is a cross-sectional view taken along line 9-9 of FIG. 6.

Specifically, the bead part 73 continues from the top part 74 and has an orthogonal-side part 118 having a height δ, as shown in FIG. 9.

Next, an operation of the vehicle body side portion structure will be discussed.

In the vehicle body side portion structure, a load applied to the side sill 14 is transmitted to the center pillar 21 and front pillar 16 through the center connection structure 24 and front connection structure 25, respectively.

Specifically, the load is partially transmitted to the center pillar 21 through the orthogonal-side part 105 of the bead part 72 in the overlap-connection part 31, thereby increasing the strength of the overlap-connection part 31 and hence the strength of the section (cross-connection part 121) where the side sill 14 is connected to the overlap-connection part 31.

Furthermore, the load is partially transmitted to the front pillar 16 through the orthogonal-side part 118 of the bead part 73 in the overlap-connection 42, thereby increasing the strength of the overlap-connection part 42 and hence the strength of the section (cross-connection part 123) where the side sill 14 is connected to the overlap-connection part 42.

In the vehicle body side portion structure, note additionally that a liquid trapped in the space formed by the arcuate parts 68, 71 can be drained in the direction as shown by arrow a2 (see FIGS. 4 and 8) through the bead parts 72, 73.

For example, a surface-treatment liquid held in the space can be drained through the bead parts 72, 73, which liquid is used for treatment of the vehicle 12 by means of a dipping or a spraying process, resulting in a reduced drying operation time of the surface treatment using the liquid.

[Second Embodiment]

Figure 10:
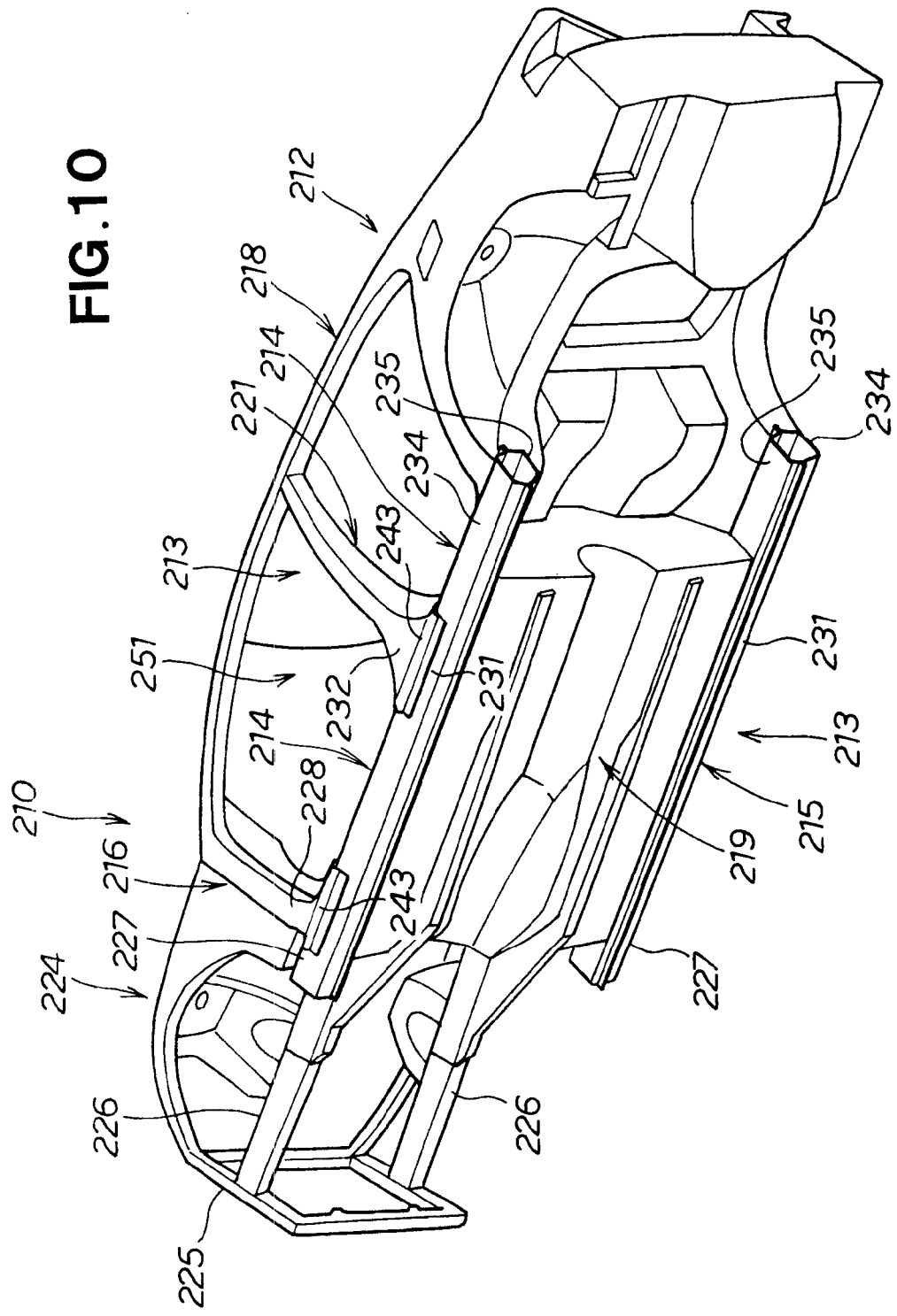
FIG. 10 is a perspective view showing a vehicle body employing a vehicle body side portion structure according to a second embodiment of the present invention, as seen from an obliquely downward direction.
Figure 11:
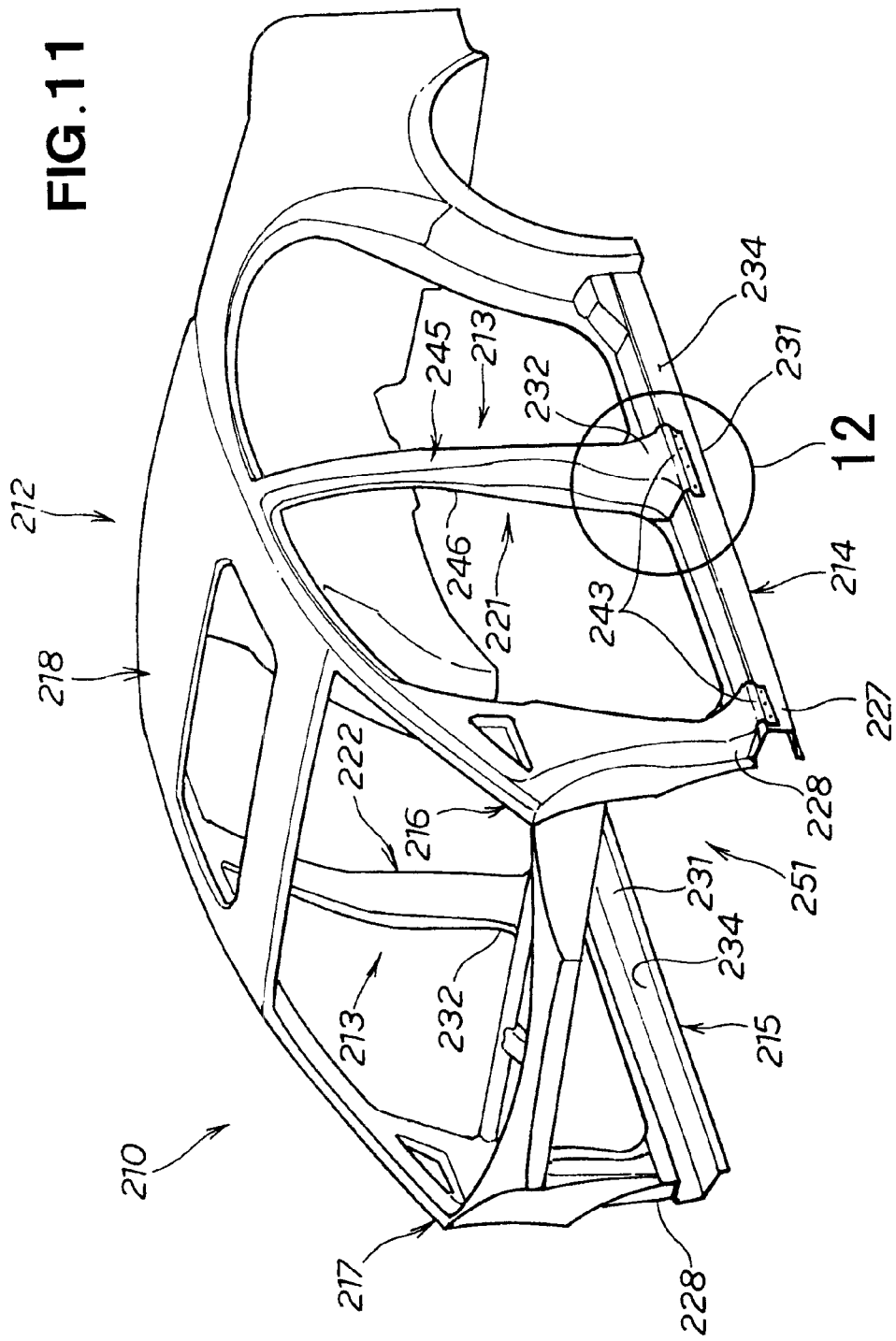
FIG. 11 is an enlarged perspective view showing the vehicle body of FIG. 10.

As shown in FIGS. 10 and 11, a vehicle body side portion structure according to a second embodiment of the present invention is applied to a left side body 213 and a right side body 213 of a vehicle 210. The structure includes left and right side sills 214, 215, located at a lower part of the side bodies 213, 213, left and right front pillars 216, 217, and left and right center pillars 221, 222.

The vehicle 210 includes a vehicle body 212 which is comprised of the side bodies 213, 213, a roof 218 connected between upper portions of the side bodies 213, 213, an underbody 219 that is connected to a lower portion of the side bodies 213, 213 and forms a floor of a passenger compartment 251, and a front section 224 connected in front of the passenger compartment 252.

The front section 224 has left and right front side frames 226, 226 extending from a front part 225 of the vehicle 210 to the under body 219.

The side sills 214, 215 are connected at their front portions 227, 227 with pillar lower parts 228, 228 of the front pillars 216, 217, respectively. Furthermore, the side sills 214, 215 are connected at their center portions 231, 231 with pillar lower parts 232, 232 of the center pillars 221, 222, respectively.

The vehicle body side portion structure according to the second embodiment will be further described with reference to FIGS. 10 to 14.

The side sills 214, 215 are placed on the left and right side ends of the floor (underbody 219) of the passenger compartment 251 and extend in a front-rear direction of the vehicle 210, respectively. The front pillars 216, 217 extend from the front parts 227, 227 of the side sills 214, 215 to the roof 218, respectively. The center pillars 221, 222 extend from the center parts 231, 231 of the side sills 214, 214 to the roof 218, respectively.

Since the left side portion structure is configured identically to the left side portion structure, only the left side portion structure will be described.

The side sill 214 includes a side-sill outer member 234 and a side-sill inner member 235, and is formed into a profile of closed cross section.

Figure 12:
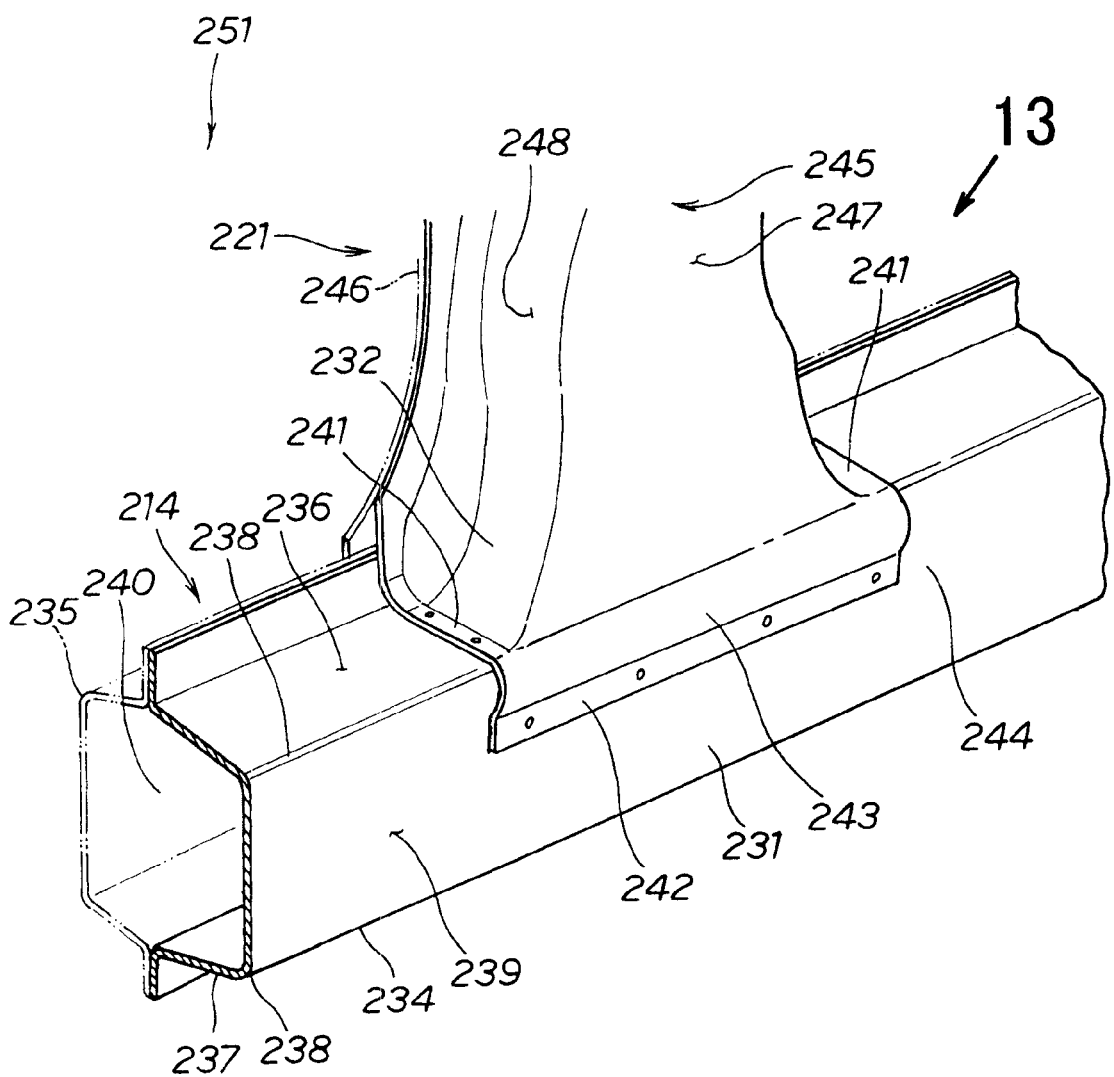
FIG. 12 is an enlarged perspective view showing encircled region 12 of FIG. 11.
Figure 13:
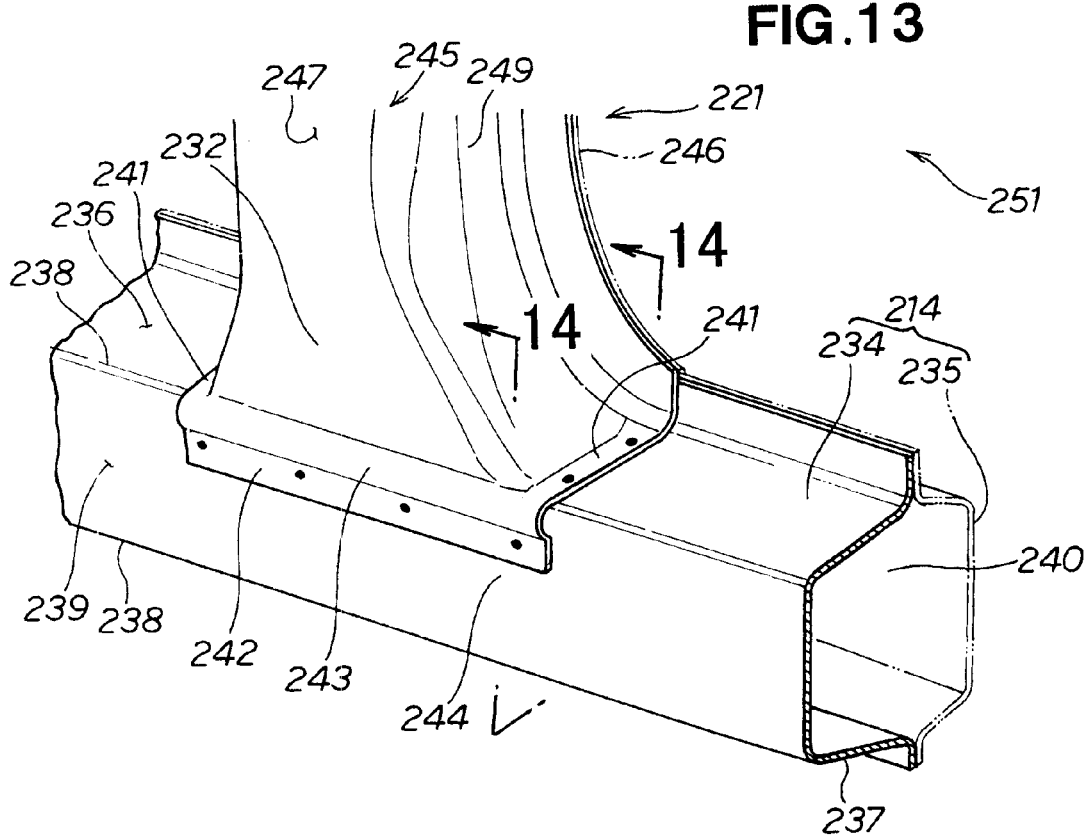
FIG. 13 is a perspective view showing the configuration of FIG. 12, as seen in the direction of arrow 13.
Figure 14:
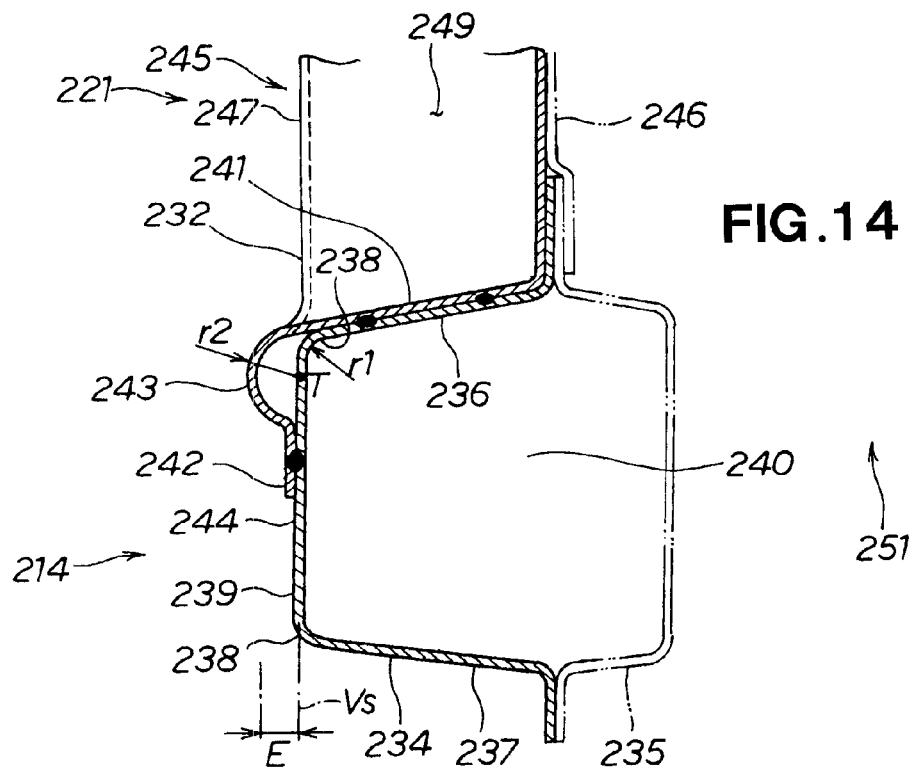
FIG. 14 is a cross-sectional view taken along line 14-14 of FIG. 13.

As shown in FIGS. 12 to 14, the side-sill outer member 234 includes an upper wall 236 at an upper portion thereof, a lower wall 237 disposed in opposed relation to the upper wall 236, and a vertical wall 239 connected to the upper wall 236 and lower wall 237 via corner parts 238, 238, thereby forming an U- or hat-shaped cross-sectional configuration (see FIG. 14). An opening 240 of the side-sill outer 234 is oriented toward the passenger compartment 251.

In the embodiment being described, both the front pillar 216 and center pillar 221 are manufactured by press-draw forming. The front pillar 216 includes a pillar lower part 228 connected to the side-sill outer 234. The center pillar 221 includes a pillar lower part 232 connected to the side-sill outer 234.

The term "press-draw forming" is used herein to represent draw forming using a press-drawing mold (metal mold), and is categorized in press-molding.

The pillar lower part 232 of the center pillar 221 includes a first overlap-connection part 241 and a second overlap-connection part 242, which are laid on and connected to at least the upper wall 236 and the vertical wall 239, respectively, among the upper wall 236, lower wall 237 and vertical wall 239 of the side sill outer member 234. The pillar lower part 232 also includes an overlap-connection corner part 243 disposed between the upper wall 236 and vertical wall 239 so as to place the latter two in continuity therewith and to pass over the corner part 238 of the side-sill outer member 234.

The pillar lower part 228 of the front pillar 216 is configured similarly to the pillar lower part 232 of the center pillar 221.

The overlap-connection corner part 243 is spaced a distance from a vicinity of the corner part 238, where the upper wall 236 and vertical wall 239 meet, to avoid interference and contact with the corner part 238, with the result that the second overlap-connection part 242 is laid on and connected to a widthwise center part 244 of the vertical wall 239.

The term "from a vicinity of the corner part 238" specifically means "from a thicknesswise centerline Vs of the vertical wall 239", as shown in FIG. 14.

The "distance to avoid contact with the corner part 238" is equal to the radius r2 of the overlap-connection corner part 243, as shown in FIG. 14. Namely, the overlap-connection corner part 243 is spaced a distance (radius r2) from the centerline Vs of the vertical wall 239.

The corner part 238, having a radius r1, of the side-sill outer member 234 is formed by means of a roll forming, bending, or press molding.

The center pillar 221 includes a grooved outer member 245 having an opening, and an inner member 246 that closes the opening of the outer member 245 to thereby form the center pillar 221 into a profile of closed cross section. The outer member 245 is formed into the grooved profile by press-drawing.

The groove profile of the outer member 245 is defined by a center-pillar side wall 247, a center-pillar front wall 248 and a center-pillar rear wall 249. The outer member includes, as described above, the first overlap-connection part 241 and second overlap-connection part contacting the side-sill outer member 234.

The center-pillar rear wall 249 has a lower part that is bent rearwardly of the vehicle 210, forming the first overlap-connection part 241 that is held in contact with and connected to the upper wall 236 of the side-sill outer 234.

The center-pillar front wall 248 has a lower part that is bent forwardly of the vehicle, forming the first overlap-connection part 242 that is held in contact with and connected to the upper wall 236 of the side-sill outer 234. Provided between the first overlap-connection part 241 and the second overlap-connection part 242 is the overlap-connection corner part 243 having a curved surface of radius r2.

The center T of the radius r2 of the overlap-connection corner part 243 is set to lie on the centerline Vs of the vertical wall 239 (see FIG. 14). In other words, the centerline Vs of the vertical wall 239 passes over the center T of the radius r2 of the overlap-connection corner part 243.

In certain conditions, the center T of the radius r2 of the overlap-connection corner part 243 may be spaced a distance E radially outwardly from the centerline Vs of the vertical wall 239.

While the "centerline Vs of the vertical wall 239" is located at a center of the thickness of the vertical wall 239, it may be set on a surface thereof. The overlap-connection corner part 243 formed arcuate with the radius r2 may alternatively be formed polygonal in section.

The overlap-connection corner part 243 is formed on the second overlap-connection part 242 including its part not connected to the first overlap-connection part 241. Specifically, the overlap-connection corner part 243 is formed in the second overlap-connection part 242 all the way along its length in the front-rear direction of the vehicle 210 at the lower part of the center-pillar side wall 247.

Next, discussion will be made as to an operation of the vehicle body side portion structure according to the second embodiment.

In the vehicle body side portion structure, as shown in FIG. 14, since the center pillar 221 is joined with the side sill 214, the overlap-connection corner part 243 of the lower part 232 of the outer member 245 does not contact or interfere with the corner part 238 of the side-sill outer 234 when the lower part 232 of the outer member 245 of the press-draw-formed center pillar 221 is laid on and connected to the roll- or bend-formed side-sill outer member 234 of the side sill 214. Such an arrangement facilitates a connection operation of the center pillar 221 to the side-sill outer 214. Furthermore, as shown in FIG. 14, since the corner part 238 of the side-sill outer member 234 in the side sill 214 has the bent arcuate portion with the radius r1, the strength of the side sill 214 is increased compared to one having a radius larger than the radius r1.

Moreover, as shown in FIG. 14, the corner part 238 of the side-sill outer 234 does not contact or interfere with the lower part 232 of the outer member 245 of the center pillar 221, because the side-sill outer 238 has the overlap-connection part 243 at the corner thereof to avoid an interfering contact.

Furthermore, the overlap-connection corner part 243 is formed at the corner portion where the first and second overlap-connection parts 241, 242 meet, with the result that press-draw forming is enabled and facilitated.

Specifically, in the press-draw forming, the radius of the arcuate corner part can be kept large, whereby unevenness that is otherwise liable to occur in the resulting products can be reduced and yields in manufacturing the products can be increased.

[Third Embodiment]

Figure 15:
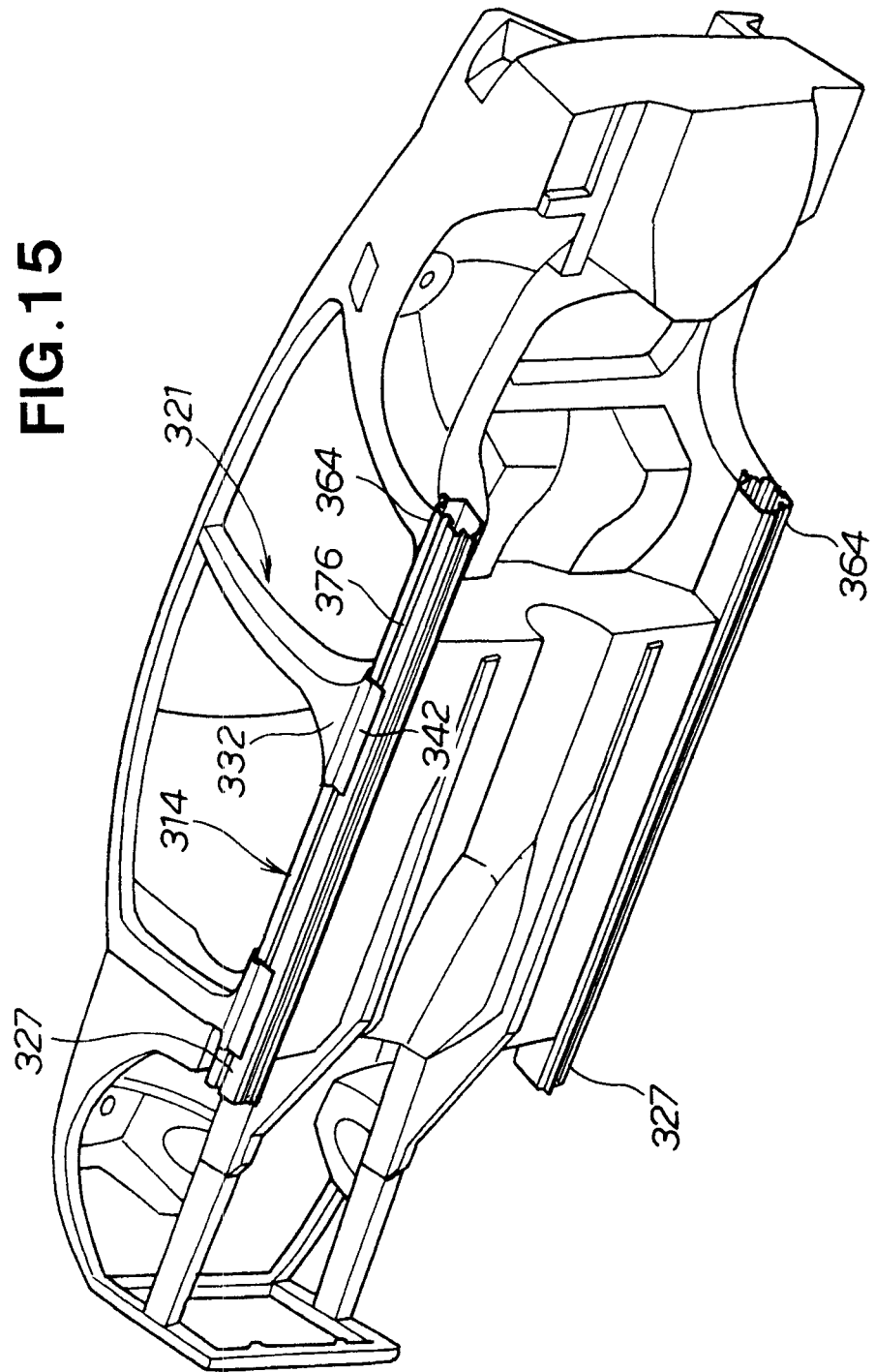
FIG. 15 is a perspective view illustrating a vehicle body employing a vehicle body side portion structure according to a third embodiment of the present invention.
Figure 16:
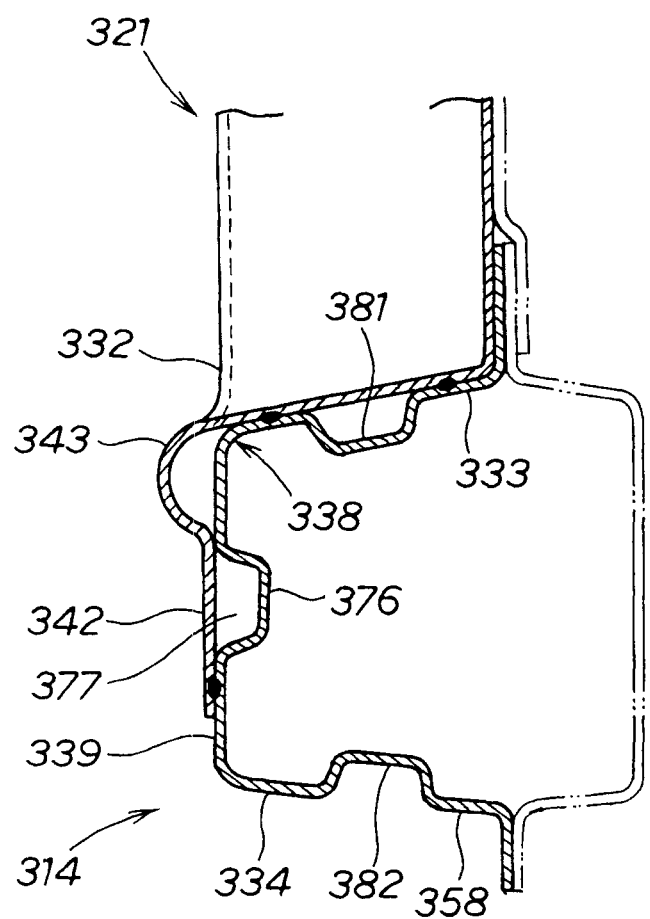
FIG. 16 is a cross-sectional view showing a state of connection between a lower part of a center pillar and a side sill of the third embodiment.

Referring now to FIGS. 15 and 16, a vehicle body side portion structure according to a third embodiment of the present invention will be described. FIG. 16 is a cross sectional view corresponding to FIG. 14 but showing the structure according to the third embodiment.

The side sill 314 according to the third embodiment includes an upper wall 333, a lower wall 358 and a vertical wall 339, at least one (e.g., upper wall 333) of which is provided with a bead (e.g., upper wall bead 381) that extends from a front part 327 to a rear end 364 of the side sill 314 to thereby form the side sill 314 into a profile of polygonal closed cross-section More specifically, the upper wall 333 is provided with an upper-wall bead 381 while the lower wall 358 is provided with a lower wall bead 382. Similarly, the vertical wall 339 is provided with a vertical-wall bead 376.

The center pillar 321 has a lower part 332 which in turn has an overlap-connection corner part 343 and a second overlap-connection part 342. The side sill 314 includes a side-sill outer member 334 having a corner part 338. The overlap-connection part 343 is disposed between the corner part 338 and vertical-wall bead 376. The second overlap-connection part 342 closes an opening 377 of the vertical-wall bead 376.

The vehicle body side portion structure according to the third embodiment operates similarly to and provides the same advantageous effects as that according to the second embodiment.

In addition, with the opening 377 of the vertical wall bead 376 being closed, the vertical-wall bead 376 has a profile of closed cross section at a center portion thereof in the longitudinal direction, whereby the side sill 314 is strengthened.

Industrial Applicability

The vehicle body side portion structure according to the present invention is particularly suitable for use on vehicle bodies.

Reference Sings List 10 vehicle; 14, 15 side sill; 16, 17 front pillar; 21, 22 center pillar; 27 vertical wall; 31 overlap-connection at a pillar lower part of the center pillar; 33 upper wall; 42 overlap-connection part at a pillar lower part of the front pillar; 51 passenger compartment; 52 floor (under body); 53 front part of the side sill; 55 side-sill inner; 56 side-sill outer; 58 lower wall; 61 aperture; 64 pillar lower part of the center pillar; 65 pillar lower part of the front pillar; 67 corner part; 68 arcuate part at the pillar lower part of the center pillar; 71 arcuate part at the pillar lower part of the front pillar; 72 bead part at the pillar lower part of the center pillar; 73 bead part at the pillar lower part of the front pillar; 74 top of the arcuate part.

The invention claimed is:

1. A vehicle body side portion structure comprising:
   right and left side sills extending longitudinally of a vehicle and forming right and left ends of a floor of a passenger compartment of the vehicle;
   pillar lower ends of right and left front pillars each extending upward from a front portion of the respective side sill; and
   pillar lower ends of right and left center pillars each extending upward from a center portion of the respective side sill,
   each of the side sills includes a side-sill inner member disposed on a side of the passenger compartment and a side-sill outer member disposed in opposed relation to the side-sill inner member so as to form the side sill into a profile of closed cross section,
   the side-sill outer member includes an upper wall disposed at an upper portion thereof, a vertical wall continuing from the upper wall, a lower wall continuing from the vertical wall and located at a lower level in opposed relation to the upper wall, and an opening oriented toward the passenger compartment, such that the side-sill outer member has a profile of U- or hat-shaped cross section,
   at least one of the pillar lower parts of the center and front pillars has an arcuate part spaced radially outwardly from a corner part where the upper wall and the vertical wall meet, and an overlap-connection part continuing from the arcuate part and laid on and connected to the vertical wall, and
   the overlap-connection part has a contact part, located below and continuing from the arcuate part, for contacting the vertical wall;
   wherein the overlap-connection part includes a bead part provided on a vehicle-forward side or a vehicle-rearward side of the contact part so as to be continuous from a top of the arcuate part and spaced from the vertical wall.

2. The vehicle body side portion structure of claim 1, wherein the contact part and the bead part are provided plurally and arranged alternately in a longitudinal direction of the vehicle.

3. The vehicle body side portion structure of claim 1, wherein the side sill has a vertical-wall bead recessed concavely toward an inside thereof and extending from a front part to a rear part of the side sill, and the vertical-wall bead is covered by the bead part.

* * * * *